United States Patent [19]

Herb et al.

[11] 4,089,244
[45] May 16, 1978

[54] STAMPING OR NIBBLING MACHINE HAVING A WORKPIECE FEED OPERABLE IN ACCORDANCE WITH THE WEIGHT AND CENTER OF GRAVITY OF THE WORKPIECE

[75] Inventors: Eugen Herb; Hubert Bitzel, both of Ditzingen, Germany

[73] Assignee: Trumpf Maschinen AG, Switzerland

[21] Appl. No.: 710,370

[22] Filed: Aug. 2, 1976

[30] Foreign Application Priority Data

Aug. 16, 1975 Germany .......................... 2536525

[51] Int. Cl.$^2$ .................... B23D 27/00; B26D 5/00
[52] U.S. Cl. .................................. 83/220; 83/237; 83/241; 83/364; 83/916
[58] Field of Search .............. 83/36, 77, 220, 237, 83/241, 248, 367, 916

[56] References Cited

U.S. PATENT DOCUMENTS

| 3,664,217 | 5/1972 | Schiewek ........................ 83/916 X |
| 3,771,613 | 11/1973 | Forster et al. ..................... 83/77 X |

*Primary Examiner*—Willie G. Abercrombie
*Attorney, Agent, or Firm*—McGlew and Tuttle

[57] ABSTRACT

A stamping or nibbling machine, comprises a workpiece support or means for engaging the workpiece at a spaced location from a punch which reciprocates upwardly and downwardly in respect to a die in order to effect the stamping or nibbling of the workpiece. The support is mounted on a transverse bar which is pivotable about a transverse guide and the guide is carried on a carriage which is pivotable about a longitudinal guide. The workpiece is fed by holding the bar and the carriage against pivotal movement and driving them in the respective longitudinal direction when the punch is lifted off the workpiece. The rate of this feed may be controlled in timed relationship to the movement of the punch so that the feed takes place when the punch is off the workpiece and in a speed of feed which is determined in accordance with the torque acting on the transverse bar and the carriage when they are released for pivotal movement and sensed by associated torque meters. In addition, the feeding control is also carried out in dependence upon the weight of the workpiece as measured, for example, by a measuring bolt at the location of the die. The stamping stroke of the punch can be released through a time-delay device which is controllable by the measuring device for determining the weight of the plate. The torque meters effect a measurement of the center of gravity of the workpiece at any time during its positioning in respect to the punch and the die.

6 Claims, 2 Drawing Figures

STAMPING OR NIBBLING MACHINE HAVING A WORKPIECE FEED OPERABLE IN ACCORDANCE WITH THE WEIGHT AND CENTER OF GRAVITY OF THE WORKPIECE

FIELD AND BACKGROUND OF THE INVENTION

This invention relates in general to the construction of stamping or nibbling machines and, in particular, to a new and useful device for regularly determining the weight and the center of gravity of a workpiece and for effecting the feed of the workpiece during the time in which the punch is lifted off the workpiece and in accordance with the sensed conditions of the workpiece.

DESCRIPTION OF THE PRIOR ART

The present invention relates to a stamping or nibbling machine comprising a mechanism for displacing the workpiece, particularly, in the longitudinal and transverse directions. In the nibbling machines of the prior art, as far as they are equipped with adjusting devices, the number of strokes of the punch and the magnitude of the feeding step are adjusted in accordance with recommended values, tables, etc. In the absence of accurate values, an optimum adjustment is frequently impossible or, as a precaution, the machine is adjusted to a too small number of strokes and/or to a too short feed step. Aside from the thickness, the size or weight of the workpiece is of great importance. Since the workpiece, for example, a metal plate, is held on one lateral border, by means of claws of the machine or similar retaining elements, the size of the workpiece is significant not only for the weight but also with respect to the moment acting at the clamps or guides of the workpiece

SUMMARY OF THE INVENTION

The present invention is directed to a nibbling machine comprising a mechanism for displacing the workpiece, particularly in the longitudinal and transverse directions, in which the number of strokes of the punch and/or the velocity of displacement of the workpiece is adjustable as a function of the weight of the workpiece.

In accordance with the invention, a stamping or nibbling machine of the just-mentioned kind is provided having the features which are set forth in claim 1. The inventive nibbling machine is equipped with devices making it possible to determine the weight and/or the distance of the center of gravity of the workpiece from the guide means thereof. Following such a determination, the device for adjusting the number of strokes of the punch and/or the control device for varying the feed velocity of the workpiece, are actuated, in particular, for automatic operation. The determined values of the weight and/or center of gravity position may be transmitted, for example, to a control counter, or the like, of the machine which, in addition, may receive information concerning the size and stressability of the punch as well as the thickness and properties of the workpiece. The determined and, if provided, also the additional values may be converted in the counter to a corresponding control signal for the device adjusting the number of strokes of the punch and/or the control device for varying the feed velocity of the workpiece. As long as the adjusting and control devices do not work automatically, the determined values may be used as data for a manual adjustment of the machine.

The inventive design makes it possible to operate the nibbling machine with the maximum efficiency but in a protective manner, because while nibbling heavy workpieces, a small number of punch strokes is set and while positioning the workpiece between the strokes, a low feeding velocity of feed is set. It is to be noted that each feeding step takes place during the time the punch is disengaged from the workpiece. A low velocity during the positioning and nibbling can be adjusted also if there is a large distance between the center of gravity of the workpiece and the guide means thereof.

In a development of the invention, the stamping stroke of the punch can be released by means of a time-delay device which is controllable by the measuring device for determining the weight. Primarily, heavy workpieces tend to after-oscillations upon a sudden braking of their feed motion. This can be remedied by the mentioned time-delay device having the effect that the stamping stroke is performed not immediately upon the stop of the feed drive but with a certain delay which is determined by the measuring device for the weight determination. The advantages are a higher working accuracy and a protection of the nibbling tool.

The measuring device for determining the center of gravity comprises, in accordance with a further development of the invention, one centering clamp each for the longitudinal and the transverse guidance as well as one torque meter each for measuring the moment at the longitudinal and the transverse guides. If, for example, the centering clamp for the longitudinal guidance is disengaged and the centering clamp for the transverse guidance is engaged, the moment relative to the longitudinal guide can be easily determined by means of the respective torque meter. The moment relative to the transverse guide is determinable analogously, and the center of gravity of the workpiece can then be determined in a simple manner from the obtained values upon taking into account the determined weight. The moment relative to the transverse guide may also be calculated by determining the reaction force at the die and the distance of the die from the transverse guide. The respective product is the value of the moment.

If the moment relative to the longitudinal guide is measured twice, in different feed positions of the workpiece the distance of advance of which is known, the weight of the workpiece can be computed from the difference of the two moments and from the distance.

The measured values are transmitted to a control device of the machine. The determined or calculated weight is compared with the predetermined admissible weights. Then, through the control device, the number of strokes effected by the eccentric shaft is varied, continuously or in steps, and/or the most suitable feed velocity is adjusted. With this provision, it is easily possible, in accordance with the measured data, to set the machine to single strokes as far as a singlestroke mechanism is provided.

According to another feature of the invention, the device for determining the weight is provided with a weight measuring bolt or the like which is located in the area of the die. The bolt is designed and positioned so as not to be affected by the nibbling operation. For example, it may be mounted so as to occupy its working position only for the purpose of determining the weight or the center of gravity. The same applies to the torque meters which, of course, must also be protected against influence or damage during the nibbling operation. The securing in position of the centering clamps is already a substantial protection in this respect.

Accordingly, it is an object of the invention to provide a stamping or nibbling machine which comprises a support which is driven in both longitudinal and transverse directions to position the workpiece in respect to a reciprocating punch and which includes means for sensing the weight of the workpiece and preferably for also sensing the position of the center of gravity of the workpiece in respect to the holding support as well as the die which cooperates with the punch and for controlling the feed of the workpiece and the reciprocation of the punch in accordance with the sensed conditions A further object of the invention is to provide a stamping or nibbling machine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

DESCRIPTION OF THE PREFERRED EMBODIMENT

Figure 1:
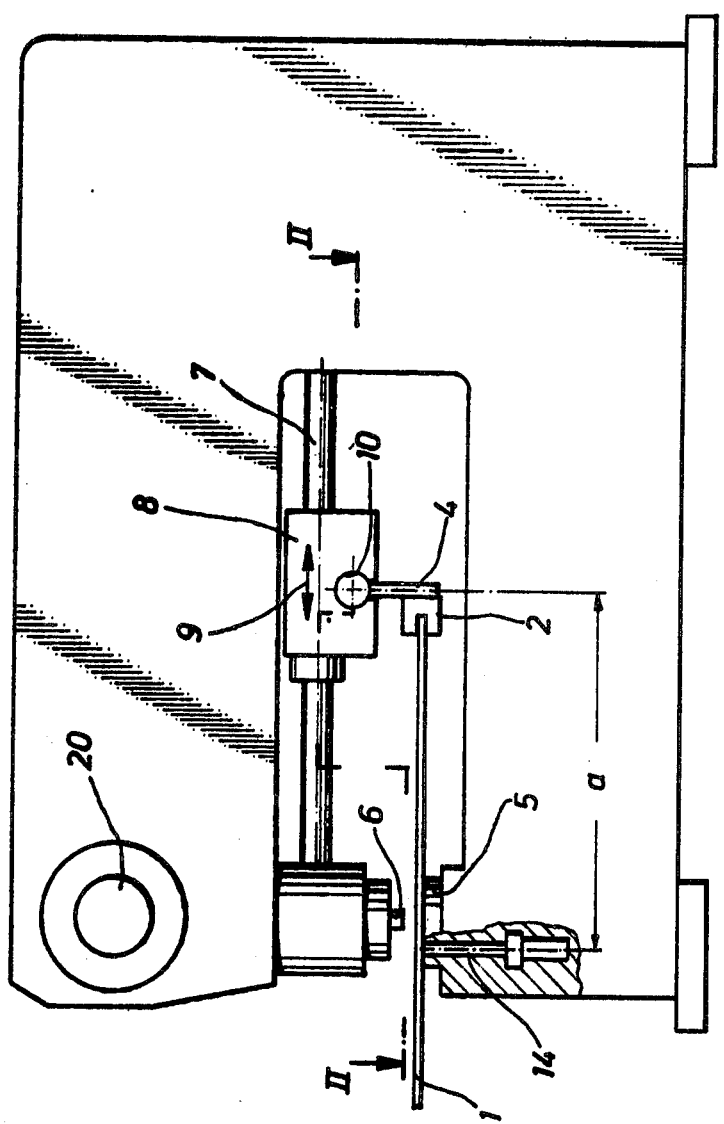
FIG. 1 is a lateral elevational view, partly in section, of a nibbling machine constructed in accordance with the invention.
Figure 2:
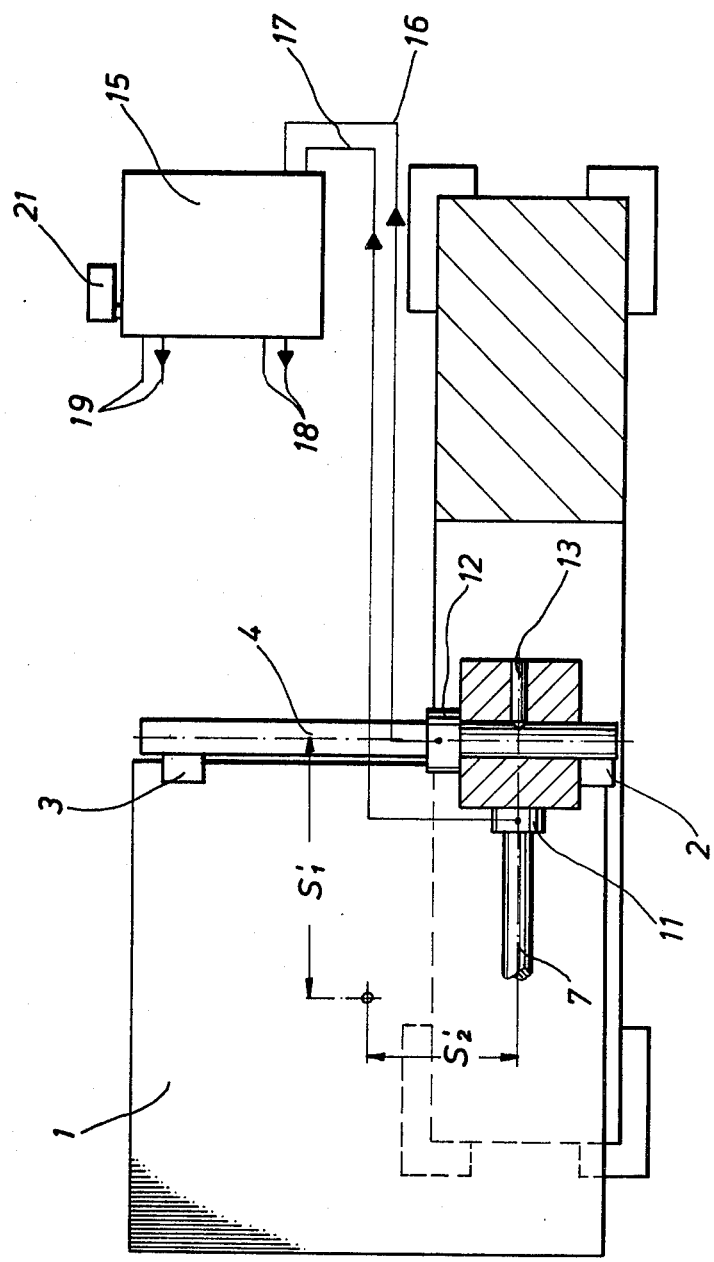
FIG. 2 is a section taken along the line II—II of FIG. 1.

Referring to the drawings in particular, the invention embodied therein, comprises a nibbling machine in which a workpiece 1 to be nibbled, for example, a metal plate, is held in position by means of support means in the form of engagement clamps or claws 2 and 3 which are carried at the lower end of a transverse bar 4. The workpiece 1 also rests against the die which cooperates with a nibbling punch 6 which is driven through an eccentric shaft by a control motor 20. The nibbling machine includes a mechanism for feeding the workpiece longitudinally and transversely, for example, by separate drive motor means included in a carriage 8 which is movable along a longitudinal guide 7 in the direction of the double-arrow 9 and the transverse bar which carries the supporting clamps 2 which is movable along a transverse guide 10. Torque meter means in the form of torque meters 11 and 12 ar associated with the carriage 8 and its associated longitudinal guide and with the transverse bar and its supporting clamps 2 and 3 and the associated transverse guide 10. For the torque meters to receive an effective reading, centering clamps for the carriage and the transverse bar in respect to its associated longitudinal guide 7 and transverse guide 10 are withdrawn to permit free pivotal movement and only clamp 13 for the transverse guide 10 is indicated in FIG. 2.

In accordance with the invention, the moment of the workpiece weight relative to the longitudinal and transverse guides is determined as a torque, by means of torque meters 11, 12. It is the product $G \cdot s_1'$ or $G \cdot s_2'$, where G is the weight, $s_1'$ is the distance of the center of gravity from transverse bar 4, and $s_2'$ is the distance of the center of gravity of the workpiece from longitudinal bar 7, both distances being measured perpendicularly. Since the distance $a$ of carriage 8 from the punch center is known, the moment $A \cdot a$ may be measured instead of the moment $G \cdot s_1'$. A is the contact pressure on a weight measuring bolt 14 which is provided closely adjacent the die. During this measurement, the centering clamp 13 for the transverse guidance 10 must be disengaged and the centering clamp for the longitudinal distance (not shown) must be engaged.

If the moment relative to the longitudinal guide is measured twice, with the distance $c$ of displacement in the transverse direction known, the weight of the workpiece is easily obtained from the following equations:

$$M_2' = G \cdot s_2' \quad M_2^+ = G(s_2' + c) \quad G = (M_2^+ - M_2'/c)$$

One may proceed so that, first workpiece 1 is clamped into claws 2, 3. Upon disengaging the respective centering clamps, moments $M_1'$ and $M_2'$ and, with the method using the distance $c$, also $M_2^+$, are measured. These measured values are transmitted to the control device of the machine. The control device determines the weight and compares this value with the predetermined admissible values of the weight. The result issues as a control signal for adjusting the number of strokes of the nibbling punch (continuously or in steps). In addition or alternatively, the feed velocity corresponding to the weight of the workpiece is determined and adjusted.

In FIG. 2, a control device 15 is shown diagrammatically. Through a line 16, the control device receives a signal corresponding to the measured value of torque meter 12 and through a line 17, it receives a signal from torque meter 11. Through indicated lines 18, 19, the control device is connected to a device for adjusting the number of strokes and to the controllable feed motors of the workpiece feeding mechanism associated with transverse bar 4 and carriage 8, respectively. Reference numeral 20 indicates a motor for the eccentric shaft of the nibbling punch drive, which is associated with an appropriate device for adjusting the speed and a single-stroke mechanism. With a single-stroke release, the machine stops on completion of each revolution of the eccentric shaft, and the next working stroke must be in each instance be released again. In this manner, particularly heavy workpieces can be displaced by feed steps at an adequate speed and with an acceleration which is safe for the machine. A provided time-delay device 21 produces the effect that the stamping stroke of nibbling punch 6 is released, after a stop of the feed drive of the workpiece and only after a certain delay, provided that the necessity of such a delay is determined by the measuring device for determining the weight. This makes it possible for the workpiece to oscillate out, which is necessary particularly for heavy workpieces.

While a specific embodiment of the invention has been shown and described in detail to illustrate the application of the principles of the invention, it will be understood that the invention may be embodied otherwise without departing from such principles.

What is claimed is:

1. A stamping or nibbling machine, comprising punch drive means for reciprocating a punch into and out of engagement with a workpiece, workpiece drive means for displacing the workpiece, longitudinal and transverse guide means guiding said workpiece for longitudinal and transverse movement, a centering clamp for each of said longitudinal and transverse guide means, a torque meter connected to each of said longitudinal and transverse guide means for measuring the moment at the longitudinal and transverse guide means, and a controller connected to said torque meters and said punch and workpiece drive means for selectively adjusting the number of strokes of the punch and for varying the velocity of displacement of the workpiece in accordance with said torque meters.

2. A stamping or nibbling machine, according to claim 1, including a time-delay device associated with said controller and said punch drive means so that the stamping stroke of the punch is released thereby.

3. A stamping or nibbling machine, according to claim 1, wherein the number of strokes of the punch is continuously adjustable to include single punch strokes.

4. A stamping or nibbling machine, according to claim 1, including a weight-measuring bolt associated with said punch drive means and engageable with the workpiece for determining the weight of the workpiece, said controller being connected to said weight-measuring bolt for selectively adjusting the number of strokes of the punch and for varying the velocity of displacement of the workpiece in accordance with said weight-measuring bolt.

5. A stamp for a nibbling machine, comprising a workpiece support, first drive means to drive said support in a longitudinal direction, second drive means to drive said support in a transverse direction, torque sensing means associated with said workpiece support for determining the weight of the workpiece and for determining the distance of the center of gravity of the workpiece from said support, a support table having a punch die engageable with the bottom of the workpiece, a punch mounted above the workpiece for reciprocating movement against and away from the workpiece, third drive means to reciprocate said punch, and control means connected to said torque sensing means and to said first, second and third drive means to drive said punch and the workpiece support in accordance with said torque sensing means, said support engaging the workpiece at a location spaced from said punch die, and said torque sensing means comprising at least one of a weight-measuring bolt associated with said die and torque meters connected to said first and second drive means.

6. A stamping or nibbling machine, comprising a workpiece support, first drive means to drive said support in a longitudinal direction, second drive means to drive said support in a transverse direction, meter sensing means associated with said workpiece support for sensing the weight of the workpiece, a support table having a punch die engageable with the bottom of the workpiece, a punch mounted above the workpiece for reciprocating movement against and away from the workpiece, third drive means to reciprocate said punch, and control means connected to said meter means and to said first, second and third drive means to drive said punch and the workpiece support in accordance with said meter sensing means, said first drive means comprising a longitudinal guide, a carriage movable along said longitudinal guide, said second drive means comprising a transverse guide extending through said carriage, a transverse bar depending from said transverse guide and engaged with the workpiece to support said workpiece, said tranverse bar being pivotable about the axis of said transverse guide and said carriage being pivotable about the axis of said longitudinal guide, said meter means comprising a torque means for sensing the torque acting on said longitudinal guide and said transverse guide, clamp means for holding said carriage and said transverse bar against relative rotation in respect to its associated longitudinal guide and transverse guide for transporation of the workpiece.

* * * * *